United States Patent [19]

Seymour

[11] Patent Number: 5,729,457
[45] Date of Patent: Mar. 17, 1998

[54] ROUTE ENTRY LOCATION APPARATUS

[75] Inventor: Leslie Gabor Seymour, Barrington, Ill.

[73] Assignee: Motorola, Inc., Schaumburg, Ill.

[21] Appl. No.: 500,210

[22] Filed: Jul. 10, 1995

[51] Int. Cl.⁶ .................................................. G06F 165/00
[52] U.S. Cl. ............................. 364/449.9; 364/449.3; 342/357; 340/990
[58] Field of Search .................... 364/443, 444.1, 364/444.2, 449.1, 449.2, 449.3, 449.7, 449.8, 449.9; 73/178 R; 340/988, 990, 991; 342/357

[56] References Cited

U.S. PATENT DOCUMENTS

| | | | |
|---|---|---|---|
| 5,107,433 | 4/1992 | Helldörfer et al. | 364/449.3 |
| 5,148,179 | 9/1992 | Allison | 364/449.9 |
| 5,365,447 | 11/1994 | Dennis | 364/449.9 |
| 5,365,450 | 11/1994 | Schuchman et al. | 364/449.7 |
| 5,365,451 | 11/1994 | Wang et al. | 364/449.7 |
| 5,420,594 | 5/1995 | Fitzgerald et al. | 364/449.9 |
| 5,470,233 | 11/1995 | Fruchterman et al. | 364/449.7 |
| 5,477,458 | 12/1995 | Loomis | 364/449.9 |

*Primary Examiner*—Gary Chin
*Attorney, Agent, or Firm*—Michael L. Smith

[57] ABSTRACT

A navigation system (10) for determining an entry point from an unmatched location to a known route, including a network of navigation route segments (48), an absolute position reverse differential corrector (27) for determining a corrected position of a remote mobile device (12) based on uncorrected absolute position data received from the mobile device (12), and a route entry determiner (32) operably coupled to the network (48) and the reverse differential corrector (27) for determining an accurate entry point of the mobile device (12) onto the network of route segments (48).

11 Claims, 3 Drawing Sheets

ROUTE ENTRY LOCATION APPARATUS

FIELD OF THE INVENTION

This invention is generally directed to the field of vehicle mute navigation and guidance systems, and specifically to centrally located systems for supporting navigation and guidance in remotely located mobile devices.

BACKGROUND OF THE INVENTION

Prior art mobile navigation devices and systems typically provided continuous, precise vehicle position in the mobile device. Theses prior art systems require the availability of full map databases and complete set of absolute and relative position sensors. This leads to an expensive mobile device because dead reckoning and map matching is needed, means to differentially correct the absolute positioning errors, and requires significant memory and processing capabilities.

Other prior art systems attempt to obtain a precise starting position of the mobile device by having the user manually indicate the crossing of a particular intersection or landmark of known location. This is inconvenient for a user, especially if he is unfamiliar with the area in which he is traveling. Requiring the user to indicate an initial position complicates the use of the device and makes it more difficult to use effectively. It would be desirable to have a system that would automatically obtain an accurate initial reference point for the mobile device.

Still other prior art mobile navigation devices and systems, are equipped with distance sensors and a global positioning system (GPS) receiver only for maintaining current position data but these devices cannot provide continuously precise position data for the mobile devices at a relatively low cost. The main reason for inaccurate position data in these devices is the selective availability of GPS, which can cause position errors of hundreds of meters.

The lack of accurate position data is particularly troublesome at the start or resumption of a trip because an accurate and timely first maneuver instruction is dependent on an accurate current position of the mobile navigation device. If an accurate determination of the mobile navigation device position is not available the possibility that a wrong or ill timed maneuver instruction will be presented to a user is very likely. The failure to give a proper first maneuver instruction is particularly likely when the mobile navigation device starts from an unmatched location, i.e. a position not related to any of the known route segments as defined in the map database. When the mobile navigation device begins a trip from an unmatched location it is difficult for a navigation system to provide an accurate first maneuver instruction because the entry point of the mobile device onto a known route segment is uncertain.

Prior art systems have attempted to resolve the problem by using either precise permanent dead reckoning with map matching or through permanent differential GPS. These options may be undesirable because full map information or a permanent differential GPS connection may not be available.

A typical centralized navigation system includes route planning by the central system before a user begins his route. This arrangement requires a wireless connection between the mobile device and the central system at least before beginning travel along the planned route. Continuous support by the central system during the duration of the trip is prohibitively expensive because of the communication link, especially if a conventional circuit switched cellular phone connection is used. Fortunately, the biggest hurdle to overcome in providing an accurate on-route position of the mobile device is obtaining an accurate route entry position. Therefore, this could be accomplished during the same communication session that provides a remote route plan. The prior art has failed to recognize and take advantage of this opportunity.

What is needed is a user friendly efficient system to provide an accurate route entry point of a mobile navigation device to a central navigation system in order to provide the mobile navigation device with accurate and timely maneuver instructions.

BRIEF DESCRIPTION OF THE DRAWINGS

For a more complete understanding of the present invention reference should be made to the drawings, where.

DETAILED DESCRIPTION OF A PREFERRED EMBODIMENT

Figure 1:
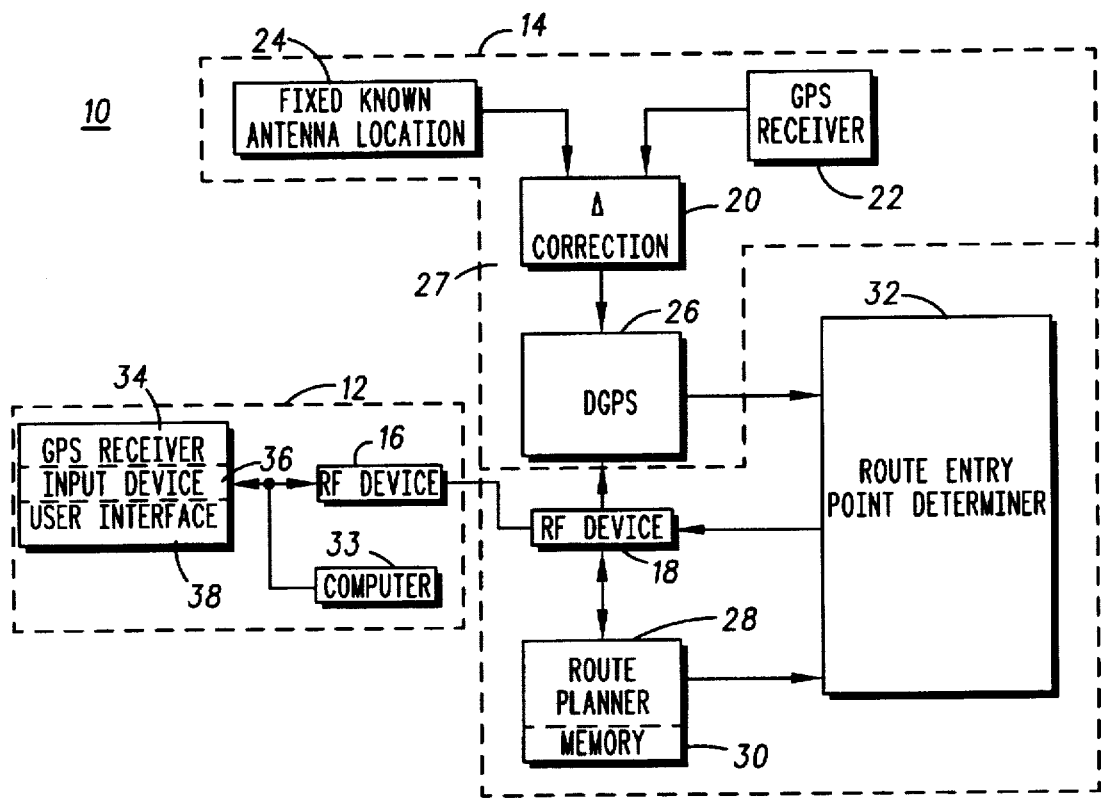
FIG. 1 is a block diagram of a system in accordance with the present invention.

In a preferred embodiment, shown in FIG. 1, a navigation system 10 includes a mobile navigation device 12 and a remote central navigation control system 14. Before a user in a vehicle (not shown) begins a route the device 12 in the vehicle requests route information from the control system 14 via two-way communication apparatuses such as RF devices 16 and 18.

One parameter of any route to be planned is the initial GPS position of the device 12. Another parameter required is a destination. As those skilled in the art appreciate, a GPS position may be in error by several hundred meters. Preferably, the control system 14 has access to GPS correction information. The GPS correction information may be obtained as shown in FIG. 1, by having a delta correction calculator 20 that determines a correction factor for GPS information received from GPS receiver 22 based on a fixed known antenna location 24. The delta correction factor is then inputted into a differential GPS (DGPS) device 26 and a corrected GPS location of the mobile device 12 is made.

Figure 2:
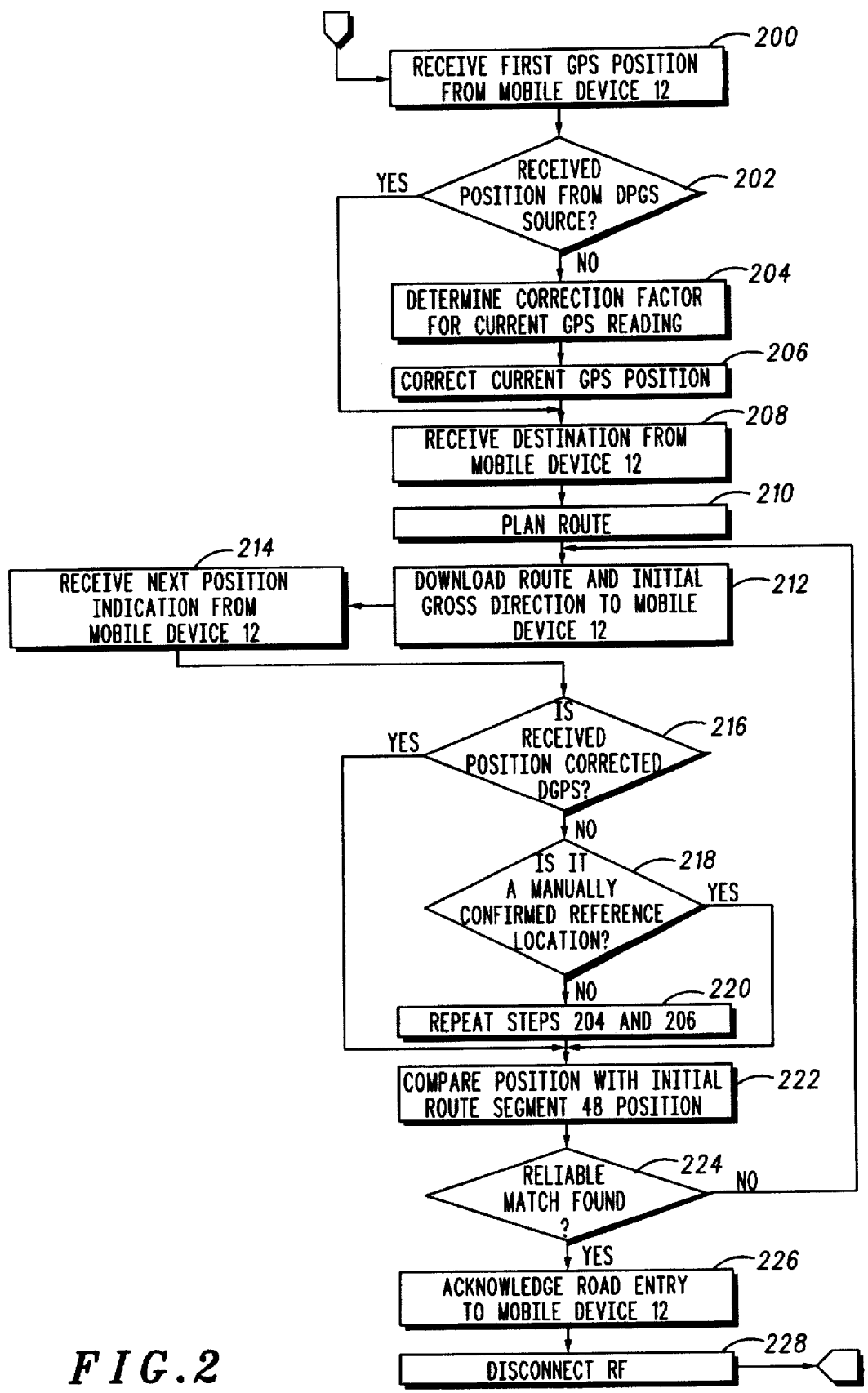
FIG. 2 is a flow chart illustrating a preferred manner of the functioning of the central navigation control system 14.

As shown in the FIG. 2 flowchart, the control system 14 receives initial GPS position of the mobile device 12 at step 200. Step 202 then determines if the received position is already corrected differentially in the mobile device 12. If NO, then step 204 obtains the correction factor 20 for the current mobile device 12 GPS reading and step 206 corrects the current GPS reading as shown in FIG. 1 at box 26. After step 206 or if step 202 is YES at step 208 the route destination is received from the mobile device 12 via RF link 16 and 18. Next, step 210 plans causes central route planner 28 to plan a route from the database of a network of navigation route segments contained in memory 30 for the mobile device 12 between the current corrected GPS position and the route destination. Step 212 then downloads the route and the initial announcement of the road name to enter onto and the gross direction to the road to the mobile device 12 via RF links 16 and 18.

Step 214 then causes control system 14 to receive subsequent position indications from the mobile device 12. Step 216 then determines if the position indication is a DGPS position from the mobile device 12. If NO then step 218 determines if position is a manually confirmed reference location and if also NO step 220 repeats steps 204 and 206 to apply reverse differential correction to the received uncorrected GPS position of the mobile device 12. If step 216 is YES or step 218 is YES or after step 220, step 222 causes route entry point determiner 32 to match the resulting corrected or confirmed position against the initial route segment 48.

Step 224 causes route entry point determiner 32 to determine if a reliable match is found indicating that the mobile device 12 entered the route. If NO then control system 14 loops back to step 214. If YES, step 226 acknowledges to the mobile device 12 that an accurate road entry point has been found. Finally, step 228 disconnects the RF link between the control system 14 and the mobile device 12.

The devices 20, 22, 24, and 26 may be collectively referred to as an absolute position reverse differential corrector 27 which determines a corrected position of the remote mobile device 12 based on uncorrected absolute position data received from the mobile device 12. The mobile device 12, preferably includes a GPS receiver 34 for transmitting uncorrected absolute position data to the control system 14, a user data input device 36 for inputting information to the control system 14, and a user interface 38 for communicating information from the control system 14 to the user.

Figure 3:
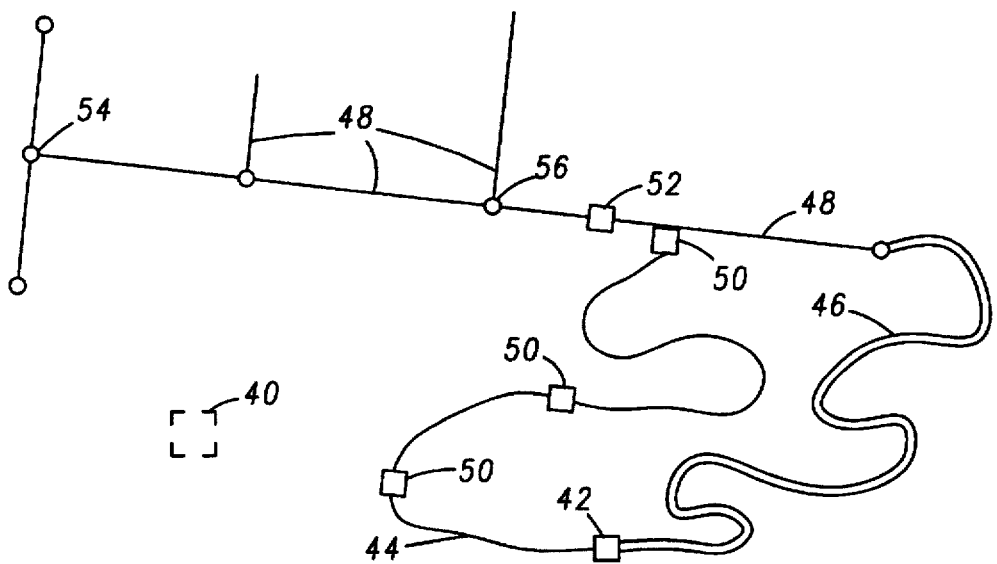
FIG. 3 is a diagram illustrating a mobile navigation device entering a known route segment in accordance with the present invention.

FIG. 3 discloses a possible scenario where the mobile device 12 moves from an unmatched location onto a known route segment. As indicated above, initially the mobile device 12 will send uncorrected GPS location information to control system 14 and is indicated at position 40. However, due to inherent errors in the GPS data the mobile device 12's corrected initial position is determined by control system 14 to be at position 42. Unmatched paths 44 and 46, i.e. unknown to control system 14, represent possible paths of mobile device 12 onto a known route segment 48. In this example mobile device 12 follows path 44 as indicated by subsequent position data 50 received by the control system 14 from mobile device 12. When corrected position 52 is determined by control system 14 the route entry point determiner 32 will indicate to the mobile device 12 that entry has been made onto a known route segment 48 and its corrected position (Step 226 of FIG. 2). At this point mobile device 12 will recalculate the remaining distance from the route entry point 52 and the first maneuver point 54.

Figure 4:
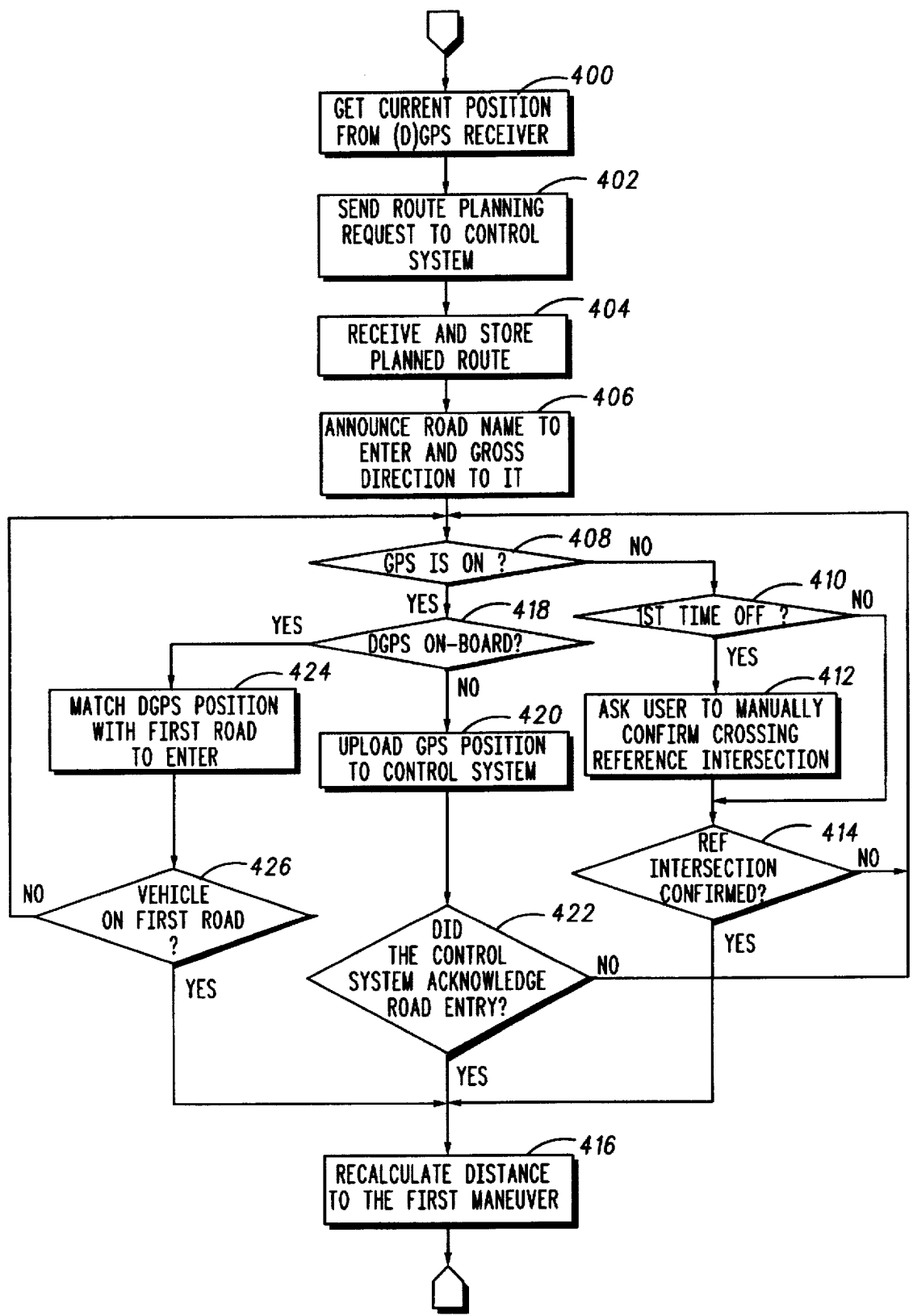
FIG. 4 is a flow chart illustrating a preferred manner of the functioning of the mobile device 12.

FIG. 4 is a flow chart disclosing a preferred manner in which to determine a distance to a first maneuver for the mobile device 12. At step 400 a current position of the mobile device 12 is obtained from the GPS receiver 34. The receiver 34 may be also include a differential GPS (DGPS) receiver, the significance of which will be explained below. Next, step 402 send a route planning request via input device 36 from mobile device 12 to the control system 14. At step 404 the route planned by control system 14 is received and stored by computer 33 of mobile device 12.

The next step 406 announces a road name of the route segment 48 that mobile device 12 is to first enter and the gross direction to that route segment 48. This information is typically communicated to the user through user interface 38 and may be any of several different types of interface such as a visual display having text or graphics or an audio output.

Step 408 then determines if the position determined by the GPS receiver 34 is available. If it is not step 410 determines if this is the first time that it is unavailable. If it is the first time unavailable, step 412 will ask the user to manually confirm when he crosses a reference intersection. This allows the control system 14 to then snap the mobile device 12 position to a correct on-route location. This confirmation is typically done by requesting the user to press a button upon reaching the reference intersection. After step 412 or if step 410 is NO, step 414 determines if the reference intersection has been confirmed. If NO the program loops back to step 408. If step 414 is YES, step 416 recalculates the distance to the first maneuver from the present location at the reference intersection.

If the GPS position is available at step 408, step 418 determines if the available position is a corrected DGPS position provided by the mobile device 12. If the receiver 34 does not include DGPS then mobile device 12 will continue to upload GPS position data to the control system 14 at step 420. Step 422 then determines if the control system 14 has acknowledged that the mobile device 12 has entered onto a known route segment 48. If step 422 is NO then the program loops back to step 408 and if it is YES the program proceeds to step 416. However, if at step 418 it is determined that there is DGPS position provided by the mobile device 12 then step 424 matches the DGPS position of mobile device 12 with the first known route segment 48 or road that mobile device 12 enters. Step 426 then determines if the mobile device 12 is on the first road. If NO then the program loops back to step 408 and if YES the program proceeds to step 416.

Thus there has been shown and described a specific embodiment of the present invention. Further modifications and improvements will occur to those skilled in the art. Such modifications could include providing additional methods of correcting the mobile device 12's position from that shown. All modifications which retain the basic underlying principles disclosed and claimed herein are within the scope of this invention.

I claim:

1. A central navigation control system for determining an entry point from an unmatched location to a known route, the central navigation control system comprising:

a network of navigation route segments;

an absolute position reverse differential corrector for determining a corrected position of a remote mobile device based on uncorrected absolute position data received from the mobile device; and a route entry determiner operably coupled to the network and the reverse differential corrector for determining an accurate entry point of the mobile device onto the network of route segments.

2. The system of claim 1 further including a central route planner for planning a route for the mobile device along the network of navigation route segments based on data received from the mobile device.

3. The system of claim 1 further including a GPS receiver operably coupled to each of the navigation system and the mobile device for receiving uncorrected absolute position data.

4. The system of claim 1 further including a route planner for planning a route and providing the mobile device with maneuver instructions based on start location and destination location data and current position data received from the mobile device.

5. The system of claim 1 wherein the mobile device includes at least:

a user data input device for entering data to be sent to the navigation system;

a user interface for communicating data to the user received from the central navigation control system;

a GPS receiver for receiving absolute position data; and a two-way communications apparatus operably couple to the input device, the user interface, and the GPS receiver for transmitting and receiving data between the mobile device and the navigation system.

6. The system of claim 5 wherein the two-way communications apparatus includes a cellular telephone.

7. A navigation system for determining a route entry point of a remotely located mobile device from an unmatched location to a known route, the navigation system comprising:

a central navigation control system including, a database of navigation route segments;

an absolute position reverse differential corrector for determining a corrected position of the mobile device at an unmatched location based on uncorrected absolute position data received from the mobile device;

a route entry determiner operably coupled to a network and the reverse differential corrector for determining an accurate entry point of the mobile device onto the navigation route segments;

a first two-way communications apparatus operably coupled to the central navigation control system for communicating data between the central navigation control system and the mobile device;

wherein the mobile device includes, a user data input device for entering data to be sent to the central navigation control system;

a user interface for receiving data from the central navigation control system;

a GPS receiver for receiving absolute position data; and a second two-way communications apparatus operably couple to the input device, the user interface, and the GPS receiver for transmitting and receiving data between the mobile device and the central navigation control system.

8. The navigation system of claim 7 wherein the central navigation control system further includes a central route planner for planning a route for the mobile device along the navigation route segments based on data received from the mobile device.

9. The navigation system of claim 7 further including a central GPS receiver operably coupled to the central navigation control system for receiving uncorrected absolute position data.

10. The navigation system of claim 7 wherein the central navigation control system further includes a central route planner for planning a route and providing the mobile device with maneuver instructions based on start location and destination location data and current position data received from the mobile device.

11. A route entry location apparatus for determining a route entry point of a remotely located mobile device from an unmatched location to a known route, the route entry location apparatus comprising:

a database of navigation route segments;

a differential global positioning system (DGPS) determiner for determining a corrected position of the remote mobile device at an unmatched location based on uncorrected absolute position data received from the mobile device; and a route entry locator operably coupled to the database and the DGPS determiner for locating an accurate entry point of the mobile device onto the navigation route segments.

\* \* \* \* \*